US008824781B2

(12) United States Patent
Litvak

(10) Patent No.: US 8,824,781 B2
(45) Date of Patent: *Sep. 2, 2014

(54) LEARNING-BASED POSE ESTIMATION FROM DEPTH MAPS

(71) Applicant: Primesense Ltd., Tel Aviv (IL)

(72) Inventor: Shai Litvak, Beit Hashmonai (IL)

(73) Assignee: Primesense Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,106

(22) Filed: Oct. 7, 2013

(65) Prior Publication Data

US 2014/0037191 A1 Feb. 6, 2014

Related U.S. Application Data

(63) Continuation of application No. 13/229,727, filed on Sep. 11, 2011, now Pat. No. 8,582,867.

(60) Provisional application No. 61/383,342, filed on Sep. 16, 2010.

(51) Int. Cl.
*G06K 9/00* (2006.01)
*G06K 9/46* (2006.01)

(52) U.S. Cl.
CPC .......... *G06K 9/00201* (2013.01); *G06K 9/4671* (2013.01); *G06K 9/00362* (2013.01); *G06K 9/00389* (2013.01)
USPC ........................................................ 382/154

(58) Field of Classification Search
None
See application file for complete search history.

(56) References Cited

U.S. PATENT DOCUMENTS

| | | | |
|---|---|---|---|
| 6,771,818 B1 | 8/2004 | Krumm et al. | |
| 7,317,830 B1 | 1/2008 | Gordon et al. | |
| 8,175,374 B2 | 5/2012 | Pinault et al. | |
| 8,295,546 B2 | 10/2012 | Craig et al. | |
| 8,320,621 B2 | 11/2012 | McEldowney | |
| 8,358,342 B2 | 1/2013 | Park | |
| 8,405,656 B2 | 3/2013 | El Dokor et al. | |
| 8,411,149 B2 | 4/2013 | Maison et al. | |
| 8,503,720 B2 | 8/2013 | Shotton et al. | |
| 8,633,890 B2 | 1/2014 | Tossell et al. | |
| 2004/0258306 A1* | 12/2004 | Hashimoto | 382/181 |
| 2005/0271279 A1* | 12/2005 | Fujimura et al. | 382/203 |
| 2007/0003141 A1 | 1/2007 | Rittscher et al. | |
| 2007/0183651 A1* | 8/2007 | Comaniciu et al. | 382/154 |
| 2008/0267458 A1* | 10/2008 | Laganiere et al. | 382/118 |
| 2008/0310706 A1 | 12/2008 | Asatani et al. | |
| 2009/0116728 A1* | 5/2009 | Agrawal et al. | 382/154 |
| 2009/0222388 A1 | 9/2009 | Hua et al. | |
| 2010/0195867 A1 | 8/2010 | Kipman et al. | |

(Continued)

OTHER PUBLICATIONS

U.S. Appl. No. 13/867,083, Office Action dated Oct. 23, 2013.

(Continued)

*Primary Examiner* — Nirav G Patel
(74) *Attorney, Agent, or Firm* — D. Kligler IP Services Ltd.

(57) ABSTRACT

A method for processing data includes receiving a depth map of a scene containing a humanoid form. Respective descriptors are extracted from the depth map based on the depth values in a plurality of patches distributed in respective positions over the humanoid form. The extracted descriptors are matched to previously-stored descriptors in a database. A pose of the humanoid form is estimated based on stored information associated with the matched descriptors.

25 Claims, 6 Drawing Sheets

(56) References Cited

U.S. PATENT DOCUMENTS

| | | | |
|---|---|---|---|
| 2010/0303289 A1 | 12/2010 | Polzin et al. | |
| 2010/0306716 A1 | 12/2010 | Perez | |
| 2011/0025689 A1 | 2/2011 | Perez et al. | |
| 2011/0173574 A1 | 7/2011 | Clavin et al. | |
| 2011/0182477 A1* | 7/2011 | Tamrakar et al. | 382/110 |
| 2011/0187819 A1 | 8/2011 | Katz et al. | |

OTHER PUBLICATIONS

U.S. Appl. No. 13/867,085, Office Action dated Nov. 7, 2013.

Krumm et al., "Multi-camera multi person tracking for EasyLiving"., Visual surveillance, 2000, Proceedings, Third International workshop pp. 1-8, 2000.

Yous et al., "People detection and tracking with World—Z map from single stereo camera".,Visual surveillance, 2008, Eighth International workshop, pp. 1-8, 2008.

Damen et al., "Detecting carried objects in short video sequences", ECCV, School of computing, University of Leeds, pp. 1-14, 2008.

Ran et al., "Multi moving people detection from binocular sequences", Center for Automation Research Institute of Advanced Computer Studies, University of Maryland, pp. 1-4, 2003.

Balcells et al., "An appearance—based approach for consistent labeling of humans and objects in video", Pattern Analysis and Application, pp. 373-385, 2004.

Cucchiara et al., "Track- based and object-based occlusion for people tracking refinement indoor surveillance", VSSN, pp. 1-7, 2004.

Ess et al., "Improved multi- person tracking with active occlusion handling", ICRA workshop of people Detection and tracking, pp. 1-6, 2009.

U.S. Appl. No. 13/098,497, Office Action dated Apr. 7, 2014.

\* cited by examiner

LEARNING-BASED POSE ESTIMATION FROM DEPTH MAPS

CROSS-REFERENCE TO RELATED APPLICATION

This application is a continuation of U.S. patent application Ser. No. 13/229,727, filed Sep. 11, 2011, which claims the benefit of U.S. Provisional Patent Application 61/383,342, filed Sep. 16, 2010. Both of these related applications are incorporated herein by reference.

FIELD OF THE INVENTION

The present invention relates generally to methods and systems for three-dimensional (3D) mapping, and specifically to extracting high-level information from depth-map data.

BACKGROUND OF THE INVENTION

A number of different methods and systems are known in the art for creating depth maps. In the present patent application and in the claims, the term "depth map" refers to a representation of a scene as a two-dimensional matrix of pixels, in which each pixel corresponds to a respective location in the scene and has a respective pixel depth value, indicative of the distance from a certain reference location to the respective scene location. (In other words, the depth map has the form of an image in which pixel values indicate topographical information, rather than brightness and/or color of the objects in the scene.) Depth maps may equivalently be referred to as 3D maps, depth images, or 3D images.

Depth maps may be created by various techniques, such as by detection and processing of an image of an object onto which a pattern is projected. Methods of depth mapping of this sort are described, for example, in POT international Publications WO 2007/043036 A1, WO 2007/105205 and WO 2008/120217, as well as in U.S. Patent Application Publication 2010/0007717, whose disclosures are incorporated herein by reference. Depth maps may alternatively be created by stereoscopic methods or by time-of-flight measurements, as well as by other methods that are known in the art.

Depth maps may be processed in order to segment, identify and localize objects and their components in the scene. Identification of humanoid forms (meaning 3D shapes whose structure resembles that of a human being) in a depth map, and the exact poses of these forms, which may change from frame to frame, may be used as a means for controlling computer applications. For example, PCT International Publication WO 2007/132451, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

SUMMARY

Embodiments of the present invention provide methods, devices and software for extracting information from depth maps.

There is therefore provided, in accordance with an embodiment of the present invention, a method for processing data, which includes receiving a depth map of a scene containing a humanoid form. The depth map includes a matrix of pixels having respective pixel depth values. Respective descriptors are extracted from the depth map based on the depth values in a plurality of patches distributed in respective positions over the humanoid form. The extracted descriptors are matched to previously-stored descriptors in a database. A pose of the humanoid form is estimated based on stored information associated with the matched descriptors.

In some embodiments, extracting the respective descriptors includes dividing each patch into an array of spatial bins, and computing a vector of descriptor values corresponding to the pixel depth values in each of the spatial bins. Typically, each patch has a center point, and the spatial bins that are adjacent to the center point may have smaller respective areas than the spatial bins at a periphery of the patch. Additionally or alternatively, the spatial bins may be arranged radially around the center point.

In disclosed embodiments, the descriptor values are indicative of a statistical distribution of the depth values in each bin and/or of a distribution of at least one type of depth feature in each bin, selected from the group of depth features consisting of depth edges and depth ridges. The distribution may be indicative of at least one characteristic of the depth features, selected from the group of characteristics consisting of a spatial distribution of the depth features and a directional distribution of the depth features.

In one embodiment, matching the extracted descriptors includes finding a respective approximate nearest neighbor of each of the matched extracted descriptors among the stored descriptors in the database.

In some embodiments, the descriptors in the database are associated with corresponding pointers to respective locations, i.e., 3D vectors indicating relative locations, of body joints, and estimating the pose includes applying the pointers to the respective positions of the patches from which the matching descriptors were extracted in order to estimate the locations of the joints of the humanoid form. The database may be created by processing a set of training maps in which ground-truth locations of the body joints are indicated in order to find the corresponding pointers.

In some embodiments, estimating the pose includes associating respective weights with the estimated locations of the joints provided by the extracted descriptors, and applying a weighted voting process using the weights to find the locations of the joints. The weights may be computed based on at least one weighting term that is selected from a group of weighting terms consisting of:

a similarity term, based on a descriptor distance between the matched descriptors;

a patch distance term, based on a Euclidean distance between a patch position and a joint location;

a joint distance term, based on a joint distance between a given joint location and a parent joint location that has already been estimated;

a predictive term, based on a previous joint location derived from a preceding depth map;

a variance term, based on a variance of the joint location determined in creating the database; and a bone length term, based on distance between a current estimated bone length and an expected bone length derived from the locations of the joints.

Additionally or alternatively, associating the respective weights includes assessing a reliability of the patches providing the estimated locations, and assigning reliability values to the estimated locations based on the assessed reliability.

In a disclosed embodiment, the method includes normalizing a depth of the depth map by finding a representative depth coordinate of the humanoid form in the depth map and projecting a point cloud derived from the depth map responsively to the representative depth coordinate, and applying the normalized depth in matching the descriptors and estimating the pose.

Alternatively or additionally, estimating the pose includes finding respective locations of joints of the humanoid form, and the method includes calibrating a scale of the humanoid form by finding a distance between the locations of the joints and scaling the depth map responsively to the distance, and applying the calibrated scale in matching the descriptors and estimating the pose.

In some embodiments, receiving the depth map includes receiving a sequence of depth maps, and estimating the pose includes tracking movement of the humanoid form over multiple frames in the sequence. The method may include controlling a computer application responsively to the tracked movement.

There is also provided, in accordance with an embodiment of the present invention, mapping apparatus, including an imaging assembly, which is configured to provide a depth map of a scene containing a humanoid form. A processor is configured to extract from the depth map respective descriptors based on the depth values in a plurality of patches distributed in respective positions over the humanoid form, to match the extracted descriptors to previously-stored descriptors in a database, and to estimate a pose of the humanoid form based on stored information associated with the matched descriptors.

There is additionally provided, in accordance with an embodiment of the present invention, a computer software product, including a computer-readable medium in which program instructions are stored, which instructions, when read by a computer, cause the computer to receive a depth map of a scene containing a humanoid form, to extract from the depth map respective descriptors based on the depth values in a plurality of patches distributed in respective positions over the humanoid form, to match the extracted descriptors to previously-stored descriptors in a database, and to estimate a pose of the humanoid form based on stored information associated with the matched descriptors.

The present invention will be more fully understood from the following detailed description of the embodiments thereof, taken together with the drawings in which:

DETAILED DESCRIPTION OF EMBODIMENTS

Overview

Depth maps provide a wealth of information, particularly when they are presented in a continuous stream over time. To use this information in games and other applications based on depth maps, however, one must deal with the difficulties inherent in capturing, processing, and extracting high-level information from such maps. Finding and tracking the parts of a moving humanoid form in a sequence of depth maps is a particular challenge.

Embodiments of the present invention that are described hereinbelow provide robust, efficient methods, systems and software for extracting humanoid forms from depth maps. In particular, the disclosed embodiments apply a patch-based (compositional) learning method for pose estimation from depth-map data. This method allows even poses that were not learned previously to be composed from learned pose segments in the processed depth map.

The disclosed methods are directed particularly to reconstructing a "skeleton" of a 3D form that is believed to correspond to a humanoid body. Such a skeleton is a schematic model that includes the torso, head and limbs and indicates their respective locations. The relative locations of the joints in the skeleton define a "pose" of the body. The parameters and motion of such a skeleton can serve as a simplified input to application programs, enabling such programs to respond to users' gestures and posture. (For this reason, a humanoid form in a depth map is sometimes referred to in the description that follows as a "user.") Alternatively, the disclosed methods may be applied to only a part of a body that is captured in a depth map, such as the upper body, head or arm.

In the embodiments disclosed below, the pose of a humanoid form is estimated using local descriptors, which are based on local statistics in spatial bins of patches in a depth map. In one embodiment, the descriptors refer to "2.5D" depth patches and combine depth-edge counts with representative depth values (such as mean values) in a set of bins that are arrayed radially around the center point of the patch. These patches and their descriptors serve as the basis for non-parametric learning and corresponding detection, by searching a descriptor database, typically using an Approximate Nearest Neighbors (ANN) algorithm. The results of this search serve as inputs to a weighted voting process, which finds the locations of joints of the humanoid form with high reliability. Specifically, each ANN query result is weighted based on several factors, including a body model.

The methods described herein may be used instead of or as a complement to parametric, heuristic methods of skeleton extraction. Methods of this latter type are described, for example, in U.S. Patent Application Publication 2011/0052006, whose disclosure is incorporated herein by reference.

System Description

Figure 1:
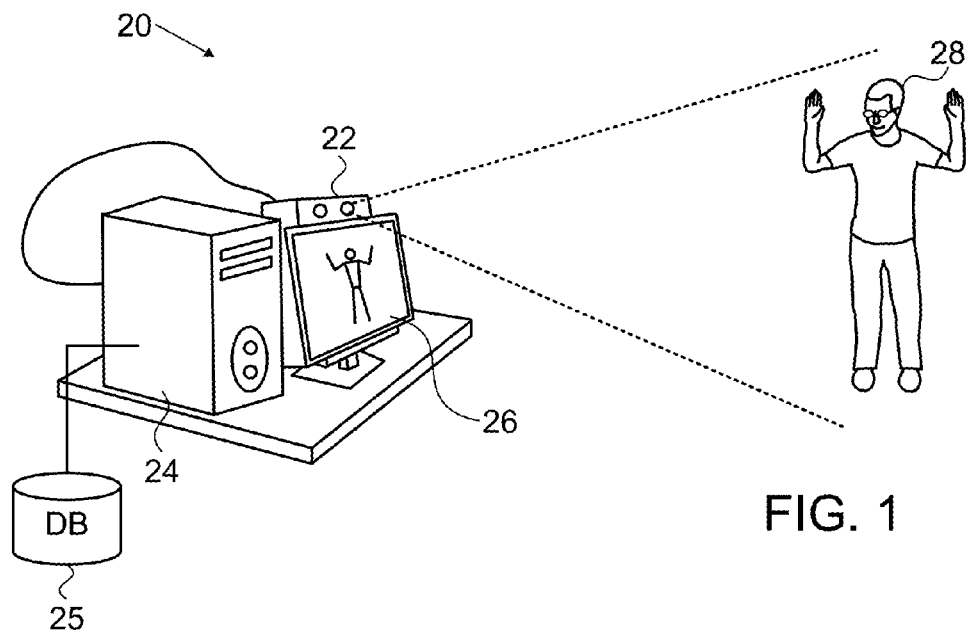
FIG. 1 is a schematic, pictorial illustration of a system for 3D mapping and tracking of humanoid forms, in accordance with an embodiment of the present invention.

FIG. 1 is a schematic, pictorial illustration of a 3D user interface system 20, in accordance with an embodiment of the present invention. The user interface is based on a 3D imaging assembly 22, which captures 3D scene information that includes at least a part of the body of a human user 28. Assembly 22 may also capture 2D color video images of the scene. Details of a 3D imaging assembly of this sort are described, for example, in PCT International Publication WO 2010/004542, whose disclosure is incorporated herein by reference.

Assembly 22 outputs a sequence of frames containing 3D map data (and possibly color image data, as well) to a computer 24, which extracts high-level information from the map data. This high-level information is typically provided via an Application Program Interface (API) to an application running on computer 24, which drives a display screen 26 accordingly. For example, user 28 may interact with game software running on computer 24 by moving his limbs and changing his body posture.

In one embodiment, assembly 22 projects a pattern of spots onto a scene containing user 28 and captures an image of the projected pattern. Assembly 22 or computer then computes the 3D coordinates of points in the scene (including points on the surface of the user's body) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in the references cited above in the Background section.

Alternatively, system 20 may use other methods of 3D mapping, such as stereoscopic imaging or time-of-flight measurements, based on single or multiple cameras or other types of sensors, as are known in the art.

In the embodiment shown in FIG. 1, system 20 captures and processes a temporal sequence of depth maps containing user 28, while the user moves his body. Software running on a processor in assembly 22 and/or computer 24 processes the 3D map data to extract patch descriptors of the humanoid forms corresponding to the users in the scene, as explained in detail hereinbelow. The software matches these descriptors to patch descriptors stored in a database 25, based on a prior learning process, in order to estimate the pose of each form. The pose typically includes 3D locations of the user's joints and extremities.

The software may also analyze the trajectory of the hands and/or other body parts over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on computer 24. This program may, for example, move and modify images presented on display 26 in response to the pose and/or gesture information.

Computer 24 typically comprises a general-purpose computer processor, which is programmed in software to carry out the functions described hereinbelow. The software may be downloaded to the processor in electronic form, over a network, for example, or it may alternatively be provided on tangible, non-transitory media, such as optical, magnetic, or electronic memory media. Database 25 is likewise stored in a memory associated with the computer. Alternatively or additionally, some or all of the described functions of the computer may be implemented in dedicated hardware, such as a custom or semi-custom integrated circuit or a programmable digital signal processor (DSP). Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly.

As another alternative, at least some of these processing functions may be carried out by a suitable processor that is integrated with display screen 26 (in a television set, for example) or with any other suitable sort of computerized device, such as a game console or media player. The sensing functions of assembly 22 may likewise be integrated into the computer or other computerized apparatus that is to be controlled by the sensor output.

FIGS. 2A-2D are schematic representations of a depth map captured by assembly 22, showing stages in a process of pose estimation, in accordance with an embodiment of the present invention. The depth map, as explained above, comprises a matrix of pixels having respective depth values. The brightness of each pixel in FIGS. 2A-2D and subsequent figures corresponds to its depth value, i.e., the measured distance from sensing device 22, with the shade of gray growing lighter with increasing depth. Computer 24 processes these depth values in order to identify and segment a component of the image (i.e., a group of neighboring pixels) having characteristics of a humanoid form 34. These characteristics, may include, for example, overall size, shape and motion from frame to frame of the sequence of depth maps. Methods for identification and segmentation of such forms in sequences of depth maps are described, for example, in U.S. patent application Ser. No. 12/854,187, filed Aug. 11, 2010, whose disclosure is incorporated herein by reference.

Figure 2A:
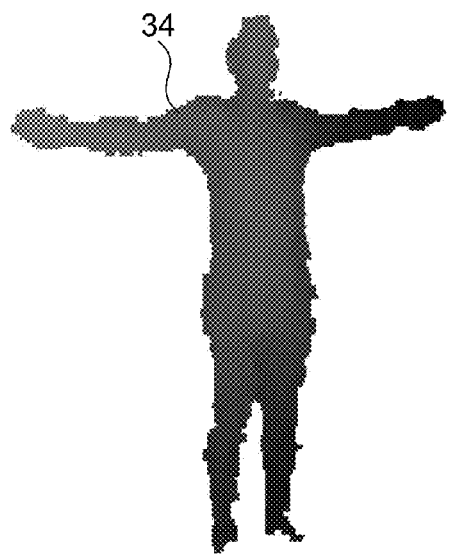
FIGS. 2A-2D are schematic representations of a depth map, showing successive stages in a process of pose estimation, in accordance with an embodiment of the present invention.
Figure 2B:
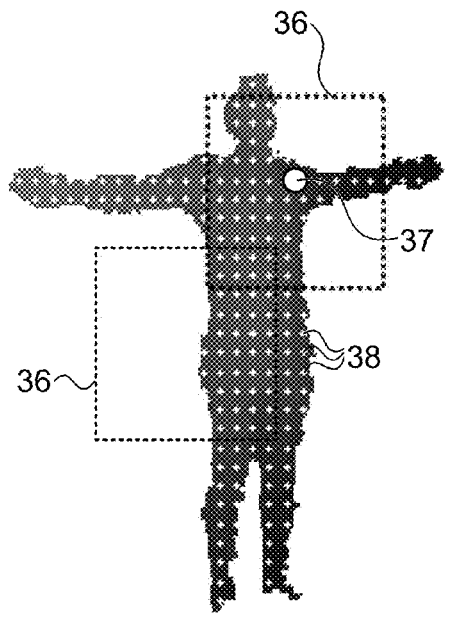

Following segmentation of the form shown in FIG. 2A, computer 24 defines an array of patches 36 extending over all or part of form 34, as illustrated in FIG. 2B. Each patch contains a predefined area within the depth map, which is centered on a center point 38 and is typically subdivided into spatial bins, as illustrated in the figures that follow. One patch 36, centered on a point 37 on the left shoulder of FIG. 34, is shown here by way of example, and another patch 36 on the right hip is shown, as well. Computer 24 typically processes many overlapping patches of this sort, each centered on a different point 38. Although patch 36 is square, the patches may alternatively be round, as illustrated in the figures that follow, or may have any other suitable shape. The patches may be distributed uniformly over the area of the humanoid form in the depth map, as illustrated by the grid of points 38 in FIG. 2B, or alternatively, the patches may be non-uniformly distributed, for example, concentrated along and in the vicinity of depth-edges.

Figure 2C:
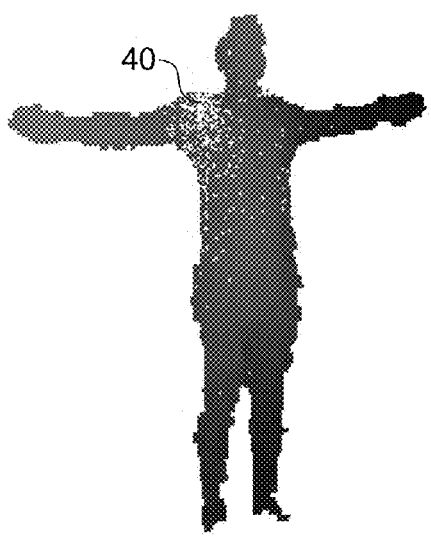
Figure 2D:
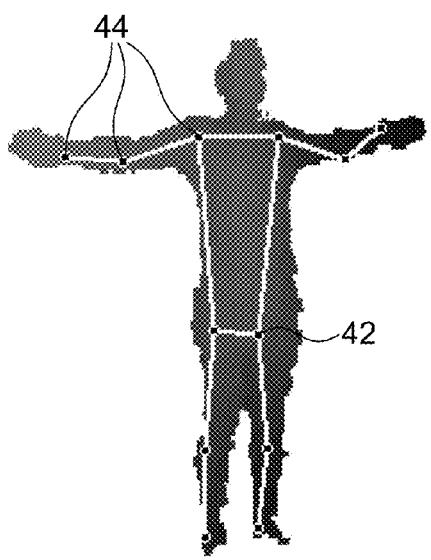

Computer 24 computes a descriptor for each patch 36, as described below, and matches the descriptors to previously-stored descriptors in database 25. Each of these stored descriptors was extracted at a known location on a humanoid form and is associated with pointers to the locations of joints in the humanoid form, as explained below. The pointers of the matching descriptors are used to generate a "cloud" 40 of estimated joint locations (in this case referring to the right shoulder joint of form 34), as shown in FIG. 2C. Computer 24 performs a weighted voting process using these points to estimate joint locations 44, and thus reconstructs a skeleton 42 of humanoid form 34, as shown in FIG. 2D.

Computation of 2.5D Descriptors

Figure 3A:
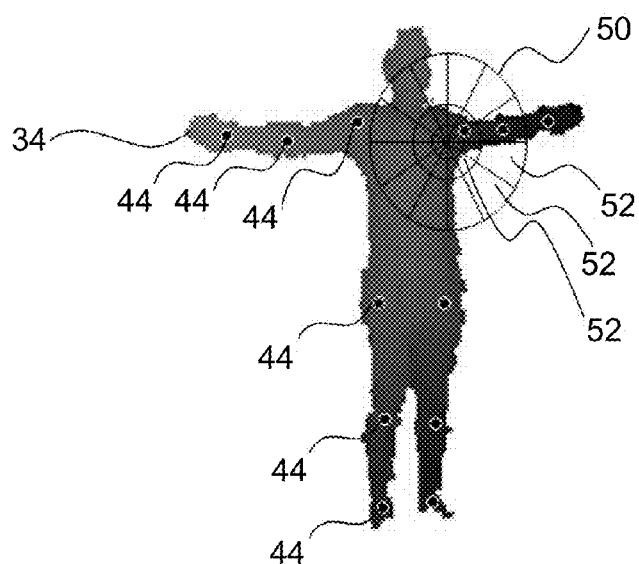
FIG. 3A is a schematic representation of a humanoid form extracted from a depth map, showing a depth patch and joint locations, in accordance with an embodiment of the present invention.

FIG. 3A is a schematic representation of humanoid form 34 extracted from the depth map of FIG. 2A, showing a depth patch 50 and joint locations 44, in accordance with an embodiment of the present invention. Patch 50 is divided into an array of sub-areas, referred to as spatial bins 52. (Again, only the single patch 50 is shown in FIG. 3A for the sake of simplicity.) Computer 24 extracts a respective descriptor for each patch 50 by computing a certain numerical value or values for each bin 52 depending on the depth edges and depth statistics in each bin 38. The computer generates the descriptor of each patch 50 as a vector of these different bin values. Details of this computation are described below.

In the pictured example, bins 52 are distributed over patch 50 as parts of radial slices. The areas of the inner bins, near the center of the patch, are smaller than those of the outer bins at the periphery of the patch, with the result that the information content of the descriptor is weighted toward the center.

Figure 3B:
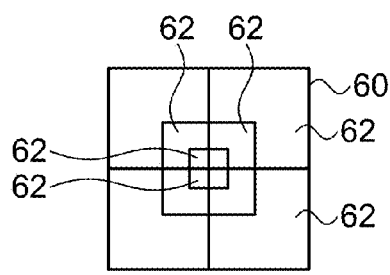
FIGS. 3B and 3C are schematic representations of depth patches, in accordance with alternative embodiments of the present invention.
Figure 3C:
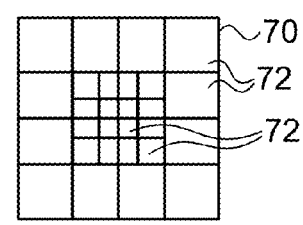

FIGS. 3B and 3C are schematic representations of depth patches 60, 70, in accordance with alternative embodiments of the present invention. These patches and corresponding bins 62, 72 may have square or rectangular shapes. The bins may be of equal areas, or they may alternatively vary, as in the examples shown in these figures and in FIG. 3A.

Figure 4C:
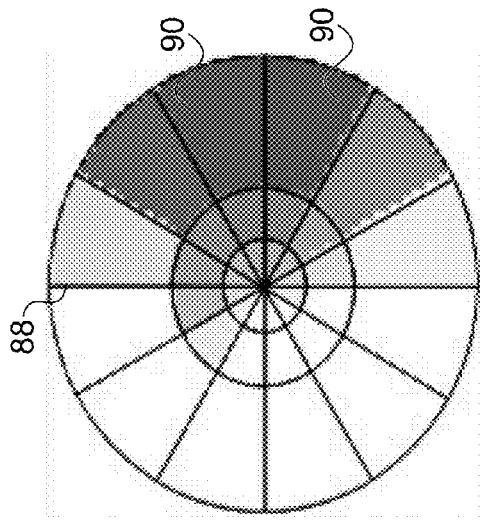
FIGS. 4B and 4C are schematic representations of descriptors associated with the patch of FIG. 4A, in accordance with an embodiment of the present invention.
Figure 4F:
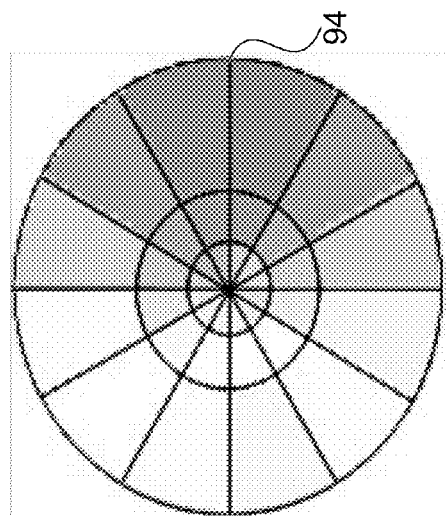
FIGS. 4E and 4F are schematic representations of descriptors associated with the patch of FIG. 4D, in accordance with an embodiment of the present invention.
Figure 4B:
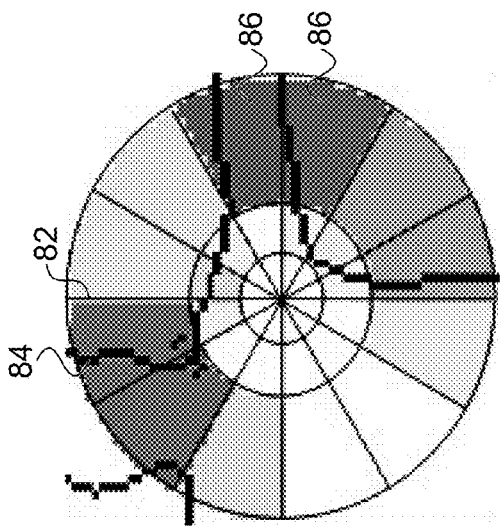
Figure 4E:
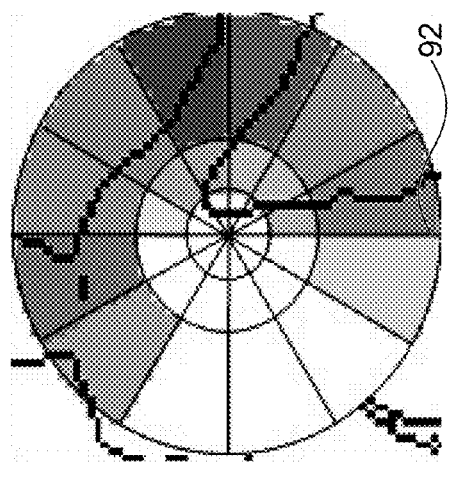
Figure 4A:
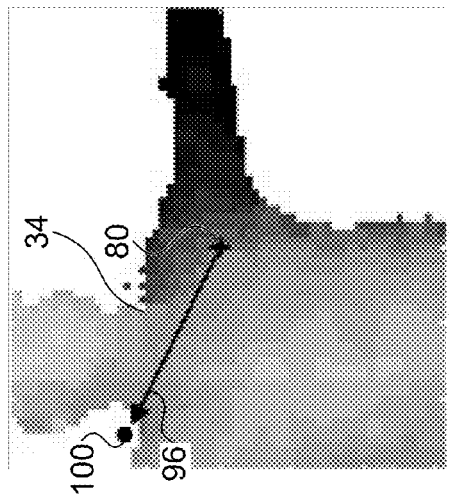
FIG. 4A is an enlarged view of a portion of a depth map, showing the location of an input patch, in accordance with an embodiment of the present invention.

Reference is now made to FIGS. 4A-4C, which schematically illustrate how descriptors may be computed for a patch centered at a point 80 in a depth map, in accordance with an embodiment of the present invention. FIG. 4A is an enlarged view of a portion of a depth map, showing the location of point 80, while FIGS. 4B and 4C schematically represent parts 82 and 88 of a descriptor associated with a patch that is centered on point 80. This descriptor is associated with a patch that is divided into radial bins, like patch 50 in FIG. 3A, and comprises descriptor elements 86, 90, which are computed over corresponding bins 52 of the patch. The descriptor elements are typically scalar numerical values, but they are illustrated in these figures as shades of gray in the corresponding bins, darkening as the corresponding numerical value increases.

To compute descriptor elements 86, computer 24 extracts depth edges 84 of the humanoid form that is shown in FIG. 4A. Although the depth map and the depth-edges (as illustrated in FIGS. 3A, 4A and 4B) are shown as two-dimensional images due to the limitations of the printed page, the depth surfaces and depth edges are actually 3D forms.

Operations on depth-edges, as described below, are performed in three dimensions. Any suitable method that is known in the art may be used to extract the depth-edge. For example, computer 24 may take a derivative of the depth map in FIG. 4A and then connect together neighboring pixels having similar derivative values until a complete edge has been defined. As another example, the computer may apply a Canny edge detector to the depth map. The above-mentioned WO 2007/132451 also describes methods that may be used in this context.

After extracting depth edge 84, computer 24 computes depth-edge statistics in each bin 52. For example, the computer may count the number of pixels in each bin that are classified as edge pixels. The gray scale value of each descriptor element 86 in FIG. 4B corresponds to the magnitude of its edge count. The direction of the edge and its polarity (positive or negative, from a distant object or background to a nearer body part, or vice versa) may also be used as part of the depth-edge descriptor. For example, the mean or median direction in each bin can be computed. Additionally or alternatively, computer 24 may find ridges (contiguous sets of local maxima) in the depth map, and use the ridge locations and/or directions in computing descriptor elements.

In addition, as shown by the gray scale in FIG. 4C, computer 24 extracts a representative depth value for each bin 52 and uses this value to compute the corresponding descriptor element 90. Unlike the edge-related values illustrated in FIG. 4B, which are derived from only a relatively small subset of the pixels in each bin (the pixels that fall on depth-edges), the depth values shown in FIG. 4C may represent depth information from all the pixels in the bins. Alternatively, a sparse (random or fixed) sample of pixels from each bin may be used in computing the representative depth values. Furthermore, whereas the edge- or ridge-related statistics relate to pre-processed depth information, the depth-related statistics refer simply to the depth itself. The representative depth values in FIG. 4C may be, for example, the mean depth value or, alternatively, a variance, a median or mode value. Outliers may be removed before calculating the statistics in order to improve the robustness to noise. In addition, a function of the representative value, such as a log or power, can be used to improve the robustness of the descriptor.

The bins used in computing the depth values may be the same as those used for the edge values, as shown in FIGS. 4B and 4C, or alternatively different bins may be used. Furthermore, although the bins 52 are shown in the figures as distinct geometrical spaces, the bins used in computing the depth and/or depth-edge statistics may alternatively overlap one another.

The descriptor for each patch 50 comprises an array of bin edge values in descriptor elements 86, concatenated with an array of bin depth values in descriptor elements 90, to form a single vector. The bins may be weighted and normalized to give a desired balance between depth-edge and/or depth-ridge and depth information and to compensate for differences in bin areas, and possibly to emphasize the values of certain bins within the patch. The resulting descriptor is referred to herein as a "2.5D" descriptor, in the sense that it represents the 3-dimensional form of the subject but refers only to the surface of the form appearing in the depth map, rather than full 3D voxel-oriented information.

The inventor has found this sort of 2.5D descriptors to be more robust and informative than 2D descriptors, while avoiding the computational complexity of handling full 3D descriptors. These 2.5D descriptors have several advantageous properties:

1. They describe the depth information in a dense manner, using only a moderate number of parameters (for example, a vector of seventy-two integer elements).
2. They achieve high information content by combining depth and pre-processed depth (such as depth-edge, depth-ridge, edge and ridge direction, and/or polarity) information. Moreover, respective weights can be chosen to ensure that the different types of information are effectively balanced.

(The weights are found using an optimization process with respect to the overall accuracy of the algorithm.)

3. They are robust against minor perturbations in the shape and angle of the body parts, and they are location-invariant.
4. The radial bins effectively emphasize the representation of the center of the depth patch, while giving high robustness with respect to the surrounding visual context.

Alternatively or additionally, the descriptors may comprise other types of information, based on other methods of extracting data from the depth maps and/or other methods of processing the extracted data.

Descriptors of the types described above are used first in a learning phase, to build database 25, and then in a detection phase. The learning phase uses a large set of training data, comprising depth maps of various human figures in different poses, with "ground-truth" information for each depth map. The ground-truth information identifies actual locations on the body, such as joints and/or other landmarks on the torso and limbs. The locations may be identified in the learning phase, for example, by fixing markers to different points on the body, and then automatically identifying the markers and their respective locations in each depth map by image processing. In the detection phase, the subjects do not generally wear such markers, and the body locations are derived from the patch descriptors, as described below.

In the example shown in FIG. 3A, markers (or other means) may be used to identify the ground-truth locations of body joints 44, including shoulders, elbows, wrists, hips, knees, and ankles. Other body locations may be used additionally or alternatively. For each patch in each of the training maps, computer 24 calculates, in addition to the descriptor that was described above, a vector distance from the patch center to the ground-truth location of each of the joints (or at least some of the joints). The computer stores this information in database 25 together with the descriptors.

Figure 4D:
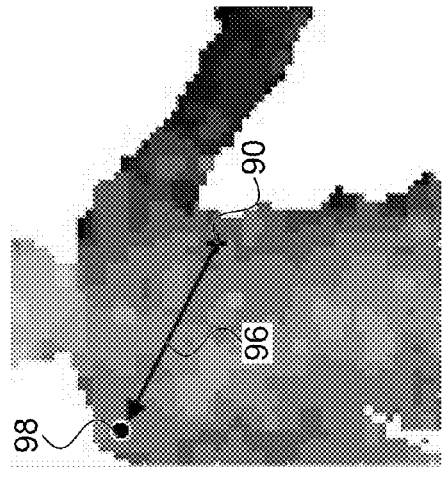
FIG. 4D is a schematic representation of a depth map, showing the location of a patch whose descriptor is stored in a database and which is matched to the input patch shown in FIG. 4A, in accordance with an embodiment of the present invention.

FIGS. 4D-4F schematically illustrate a descriptor found in the learning phase and stored in database 25, in accordance with an embodiment of the present invention. FIG. 4D is an enlarged view of a portion of a depth map that was used to create the descriptor, showing the location of a center point 90 of the corresponding patch. FIGS. 4E and 4F schematically represent parts 92 and 94 of the descriptor, corresponding to the depth-edge and depth components, as in FIGS. 4B and 4C. A pointer, having the form of a 3D distance vector 96, indicates the distance and direction from center point 90 to a ground-truth location 98 of a shoulder joint that was marked in the learning phase.

In the pose estimation phase, computer 24 matches the input patch descriptors that are extracted from the current depth map, such as the descriptor represented by FIG. 4A, to the descriptors in database 25. Assuming, by way of example, that FIG. 4A represents in input patch (also referred to as a query patch, since it is used to query the database), FIG. 4D shows an example of a retrieved patch that may be found to be a neighbor of this query patch in descriptor space. The resemblance of the corresponding descriptors can be appreciated by comparing the descriptor elements shown in FIGS. 4B and 4C with those in FIGS. 4E and 4F.

For each patch retrieved from database 25, the computer also retrieves the associated joint distance vectors. Thus, after matching the patch centered at point 80 (FIG. 4A) to the patch in the database that is centered at point 90 (FIG. 4D), computer 24 applies vector 96 to the position of this patch (represented by the position of center point 80) to find an estimated location 100 of the shoulder joint. The computer likewise collects estimated joint locations from other patches in order to form the sort of cloud 40 that is shown in FIG. 2C, and then finds the shoulder joint location of the humanoid form based on this cloud, typically by a weighted voting process, as described below. A similar approach is used to find the other joint locations.

Learning-Based Pose Estimation

Learning Phase

Figure 5:
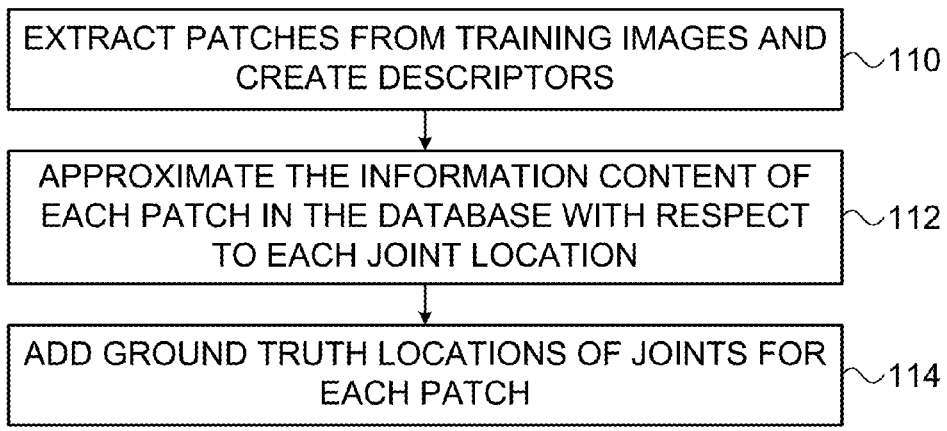
FIG. 5 is a flow chart that schematically illustrates a method for building a patch database, in accordance with an embodiment of the present invention.

FIG. 5 is a flow chart that schematically illustrates a method for building patch descriptor database 25, in accordance with an embodiment of the present invention. This method represents a learning phase, to be followed by a detection phase, which is described below with reference to FIG. 6.

The learning phase has three main steps:

In a patch extraction step 110, computer 24 (or another computer) scans the training set of depth maps and extracts multiple depth patches from each segmented humanoid form. The computer calculates a descriptor for each patch, as described above, as well as distances from the patch center to ground-truth locations. The result of this process is a database of patch descriptors.

In an information assessment step 112, the computer calculates the information content of descriptors in the database. For this purpose, the computer may go over all patches in the database and processes them as follows, for each patch P:
1. Find all other "similar" patches, meaning patches whose $L_2$ (Euclidean) distance from P in the descriptor space is below a parameter R. (All these patches are contained in a hypersphere of radius R in the descriptor space.)
2. For each joint J, calculate the location variance $V_{P,J}$ over all ground-truth locations associated with the similar patches. This variance roughly corresponds to the information content of the descriptor of P with respect to the location of J. Low variance indicates high information content of the patch with respect to the joint. This variance is later used during the detection phase (see below).
3. Remove from the database all similar patches to P, but keep P or an alternative representative of the patches that fell within the hypersphere.

Once the entire database has been processed in this manner, the computer augments the database as follows, in an augmentation step 114, for each of the patches in the database:
1. Add to the database the vector distances to the ground-truth locations of all joints in the full depth map from which the patch was taken.
2. Save the variance value $V_{P,J}$ that was calculated for each joint whose location is added to the database, as long as the variance is less than a given threshold θ.

Detection Phase

Figure 6:
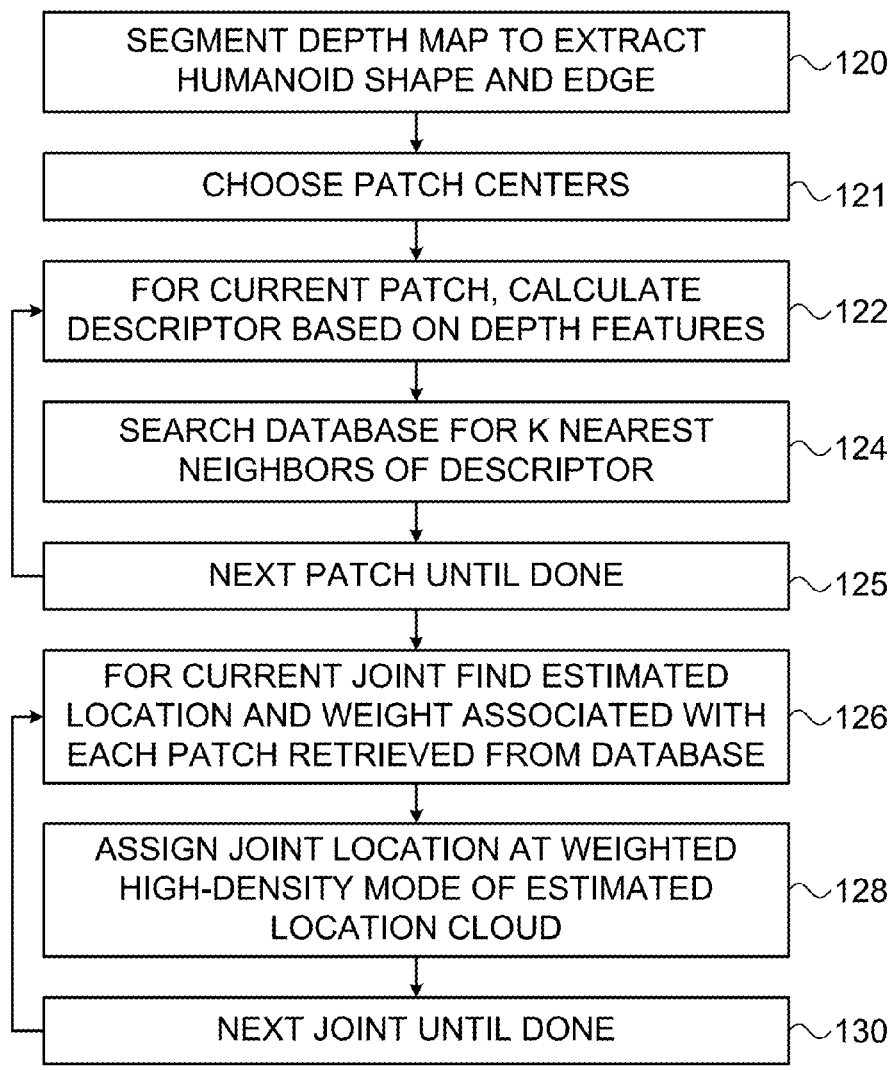
FIG. 6 is a flow chart that schematically illustrates a method for patch-based pose estimation, in accordance with an embodiment of the present invention.

FIG. 6 is a flow chart that schematically illustrates a method for patch-based pose estimation based on a depth map, in accordance with an embodiment of the present invention. This figure represents the detection phase.

In a segmentation step 120, computer 24 segments the input depth map to extract a single humanoid form, as illustrated in FIG. 2A. The result is a depth map in which all depth pixels other than the humanoid form are marked as "no-user" (white in the representation shown in the figures). The computer then calculates a depth-edge map (in which each depth pixel contains a value associated with the smoothed local direction of the edge) from the segmented depth map. Methods for segmentation and edge extraction were described above.

As part of the segmentation step, computer 24 may normalize the scale of the depth map in order to reduce spurious variations in the apparent size of the humanoid form due to variations in the distance of the user from imaging assembly 22. For this purpose, the computer may, for example, translate pixels from the depth map (using standard projective geometry) to a point cloud in real-world coordinates representing the user. The point cloud is shifted, using a fixed dz, so that the center of mass is at a target "standard" depth. The computer scales the point cloud (along all axes) using a previously-estimated user scaling factor, so that the resulting point cloud represent a user with a "standard" height. The computer projects the resulting point cloud to create a new depth map, which now represent a default user at a default distance. Following this sort of depth normalization, both the detection and learning phases become substantially invariant in both user height and location. Such depth normalization may be used in conjunction with the method of scale normalization that is described below with reference to FIG. 8, or independently.

Computer 24 chooses patch centers over the humanoid form, at a patch selection step 121. An example of one possible set of tested patch centers is shown in FIG. 2B. The computer then scans and processes many depth patches from the input depth map, in a patch extraction step 122. For each patch, the computer calculates a respective descriptor, typically in the form of a vector, based on depth, edge, and/or ridge statistics, as described above. The patches extracted from the input depth maps are referred to hereinbelow as "query patches," and their descriptors as "query descriptors."

For each query descriptor, computer 24 retrieves a certain number (K) of patches with similar descriptors from database 25, in a neighbor finding step 124. At this step, the computer may, for example, use an Approximate K-Nearest-Neighbors (ANN) method, of which several are known in the art. For instance, the computer may apply a tree-based method, as described by Arya et al., in "An Optimal Algorithm for Approximate Nearest Neighbor Searching in Fixed Dimensions," *Journal of the ACM* 45, pages 891-923 (1998); or by Muja and Lowe, in "Fast Approximate Nearest Neighbors with Automatic Algorithm Configuration," *International Conference on Computer Vision Theory and Applications* (VISAPP'09), 2009. Alternatively, the computer may apply a hash-based ANN method, as described by Gionis et al., in "Similarity Search in High Dimensions via Hashing," *Proceedings of the 25th Very Large Database (VLDB) Conference* (1999); or by Datar et al., in "Locality-Sensitive Hashing Scheme Based on p-Stable Distributions," *Proceedings of the Symposium on Computational Geometry* (2004). All of the above-mentioned publications are incorporated herein by reference. Each of the neighbor descriptors retrieved from the database is associated with a corresponding set of stored vectors pointing from the stored patch center to all the joints. The computer loops over the patches in this manner until done, in a patch iteration step 125.

Next, in a location estimation step 126, computer 24 finds the estimated location of one of joints 44 based on the joint distance vectors retrieved from the database in step 124. The inventor has found it advantageous to process the joints in a hierarchical order, beginning with joints closer to the center of the body, such as the shoulders and hips, and finding their locations first. These joint locations are then used progressively in finding the more external joints—elbows and knees, followed by wrists (or hands) and ankles (or feet), for example. Alternatively, the joints may be processed in any other suitable order.

For the current joint, the computer accumulates location votes (hints) from the neighbor patches that were retrieved from the database. The 3D vector distance of the ground-truth joint location (read from the database for each retrieved patch) relative to the center of the retrieved patch is applied relative to the center position of the query patch. In other words, assuming a query patch with center location (x, y, z) was found to match a retrieved patch with center location at (X, Y, Z), and the ground-truth location of the right shoulder relative to the center of the retrieved patch was at a distance $(D_x, D_y, D_z)$ from (X, Y, Z), this combination of query and retrieved patches will "vote" for a right shoulder location of $(x+D_x, y+D_y, z+D_z)$ in the current input depth map.

For example, as noted above, 3D distance vector 96, indicated in FIG. 4D by an arrow, points from center point 90 of the matched patch to ground-truth location 98 of the right shoulder. The vector is copied from the matched patch to the query patch (as shown by the arrow in FIG. 4A), such that the tail of the vector is placed at center point 80 of the patch. The head of the copied vector is one location vote (hint) for the user's right shoulder at estimated location 100 in the processed depth map, as shown in FIG. 4A.

Computer 24 calculates a respective weight for each of these votes. The weight represents the relevance, or confidence value, to be assigned to each vote. The weight may be based on various factors, including:

1. The $L_2$ distance (similarity) between the query and retrieved descriptors.
2. The distance between the patch center and the joint location for the retrieved patch.
3. The distance in the input depth map between the (already estimated) location of a "parent" joint (in the hierarchical body model) and the center of the query patch.
4. The distance between the estimated location of the current joint J based on the current query result and the expected location of J based on its location and velocity estimated from previous depth map frames.
5. The variance value $V_{P,J}$ with respect to the location of J that was calculated during the learning phase for the retrieved patch.
6. The distance between the current estimated bone length and an expected bone length. (The distance between the already-calculated location of the "parent" joint and the estimated location of the current joint J is calculated based on the current query result and is used to estimate the length of the bone between the parent and child joints. The expected bone length is estimated based on many former frames and known anatomical body proportions. The weight is an increasing function of the difference.)

For each of the above six factors, the weight decreases as the factor itself increases. A possible formulation of the weights is presented below in an Appendix.

Additionally or alternatively, other factors may be used in computing the weights of votes by different patches. For example, computer 24 may assign reliability weights (or reliability values) to the joint locations based on factors in the depth map or derived joint locations themselves indicating that certain votes are likely to be unreliable.

The joint locations found at step 126 define a point cloud, representing a range of possible locations of the current joint J. For example, the white points in FIG. 2C represent cloud 40 of votes corresponding to the right shoulder. Each point has an associated weight, which is calculated as explained above. Although any single location vote may be inaccurate, the collection of votes is typically much more informative.

Figures 7A, 7B:
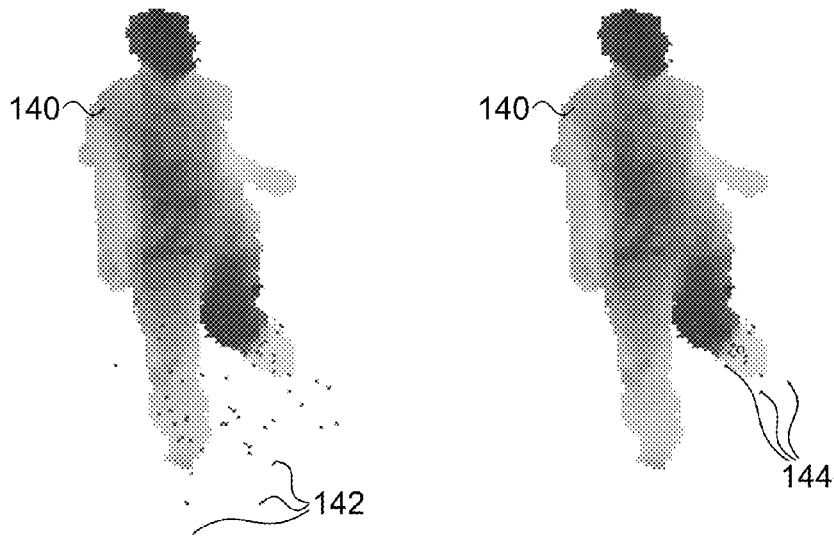
FIGS. 7A and 7B are schematic representations of a depth map, with points illustrating estimated joint locations extracted from the depth map using two different criteria, in accordance with an embodiment of the present invention.

FIGS. 7A and 7B are schematic representations of a depth map, illustrating estimated joint location extracted from the depth map of a humanoid form 140 using two different criteria, in accordance with an embodiment of the present invention. These figures represent the effect of the weights discussed above. Points 142 in FIG. 7A show the estimated location of the left foot of form 140 whose weight is larger than a certain low threshold T1, while points 144 in FIG. 7B show the subset of points whose weight is larger than a much higher threshold T2. These figures demonstrate how the weighting system described above is effective in choosing the more relevant points.

Returning now to FIG. 6, in a location assignment step 128, computer 24 finds a location in the point cloud were the weighted density of proximal points is maximal, and assigns it to be the estimated location of the joint. In other words, the computer finds a local mode of the 3D distribution of weighted points in the cloud. Although it is also possible to find the global weighted center of mass, the inventor has found that the point cloud often comprises several locally-dense areas. Therefore, choosing the location where the weighted density of local points is maximal typically gives a superior approximation of the actual joint location. Various methods may be used to find the local mode of the weighted point cloud, such as the weighted "mean-shift" algorithm described by Comaniciu and Meer, in "Mean Shift: A Robust Approach Toward Feature Space Analysis," *IEEE Transactions on Pattern Analysis and Machine Intelligence* (IEEE) 24 (5), pages 603-619 (2002), which is incorporated herein by reference.

After finding the current joint location, computer 24 repeats steps 126 and 128 for the subsequent joints in the hierarchy, through a joint iteration step 130, until the locations of all joints have been found. Thus, the entire skeleton is efficiently reconstructed, as shown, for example, in FIG. 2D.

The resulting joint locations are given for a person at a "standard" height, standing at a "standard" distance from the camera. A reverse transformation to the one applied on the original depth map may now applied to the estimated joint location, so that the output matches the original depth map.

Optionally, in the course of this process, the distances between the joints may be compared and refined in an iterative scaling process, in order to account for variations in height and build among different users. A method for scale adjustment that may be used in this context is described below with reference to FIG. 8.

Figure 8:
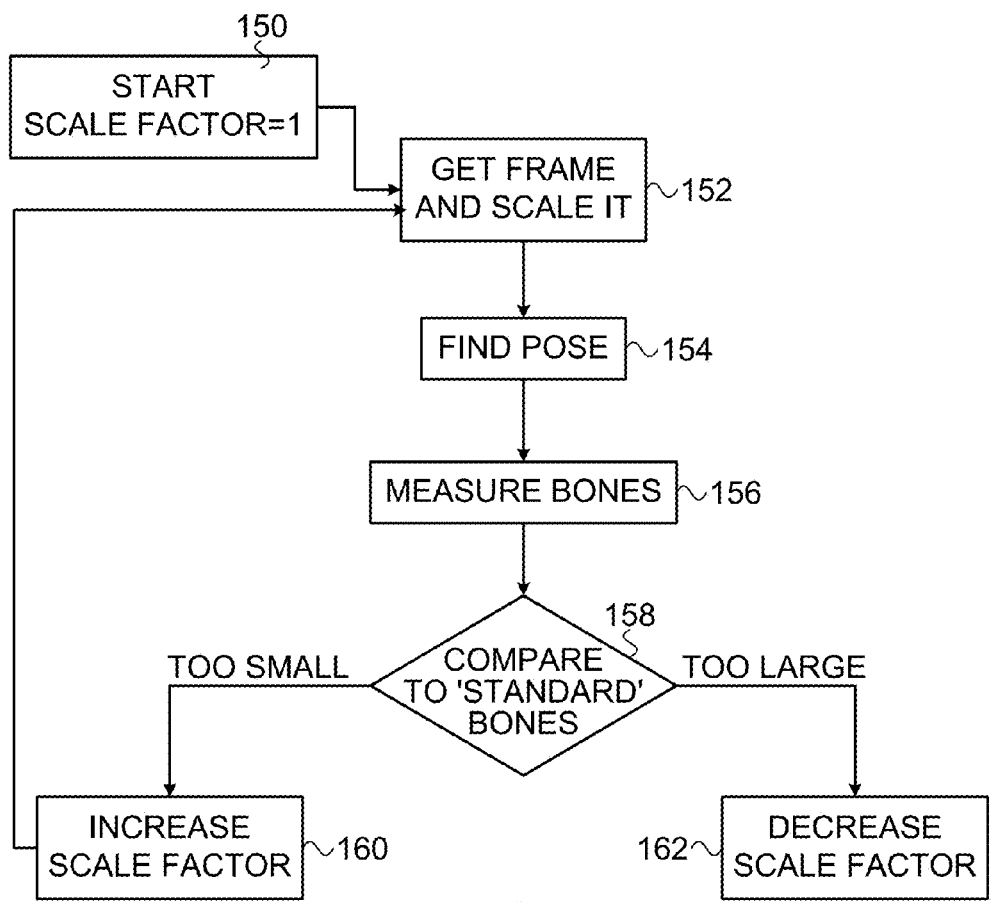
FIG. 8 is a flow chart that schematically illustrates a method for scale normalization in pose estimation, in accordance with an embodiment of the present invention.

FIG. 8 is a flow chart that schematically illustrates a method for scale calibration in pose estimation (alternatively referred to as scale normalization), in accordance with an embodiment of the present invention. This method is applied iteratively in conjunction with the method of FIG. 6 in order to compensate for differences in size and build between different users of system 20. Incorporation of the method of FIG. 8 in the pose estimation process thus provides faster and more accurate results, possibly using a smaller database 25. The method of FIG. 8 is aimed at finding the scale of the user over many frames, in contrast to the depth normalization technique described earlier, which is implemented over each single frame independently. These two normalization techniques may be used in conjunction with or independently of one another. The method of FIG. 8 is described here in the context of the pose estimation techniques that are described above, but it may likewise be applied to enhance other learning-based methods of pose estimation that are known in the art.

At an initialization step 150, computer 24 sets the scaling factor to one (or possibly to some other initial value, if some other source of information about the approximate size is given). The computer receives a depth map frame, extracts the humanoid form, and scales the depth and transverse dimensions using the current scaling factor, at a frame input step 152. The computer then finds the joint locations in the scaled depth map, using the method of FIG. 6, for example, at a pose estimation step 154.

Based on the locations of the joints, computer 24 finds the lengths of the "bones" connecting the joints in the skeleton, at a bone measurement step 156. (The "bone" measurements refer to segments of the model skeleton between given joints and, particularly in the torso, do not necessary correspond to actual physical bones.) The computer compares these bone lengths to predefined standards, at a bone comparison step 158. If the measured bones are smaller than the corresponding standards, the computer increases the scaling factor accordingly, at a scale increase step 160, or alternatively decreases the scaling factor if the bones are larger than the standard, at a scale decrease step 162. Otherwise, the scale remains unchanged. The computer applies the updated scale factor in scaling the next frame at step 152.

The process of FIG. 8 may continue indefinitely, or it may terminate when the scale has converged to a nearly-constant value after a number of iterations. If the scale factor grows too large or too small, which may be indicative of a self-reinforcing error in the scaling process, computer 24 may return to step 150 and reset the scaling factor to restart the process.

Although embodiments of the present invention are described above, for the sake of clarity, in the context of the particular components of system 20, the principles of the present invention may similarly be applied in conjunction with substantially any other type of depth mapping system. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Computation of Weights

In the embodiment described below, the specific weight function computed in step 126 is a product of terms. The following functional terms may be used. Alternatively, other functions, either linear or non-linear may be used for this purpose.

For a given joint J and a patch P in the input depth-map with its associated descriptor, along with one corresponding ANN-retrieved patch Q and its descriptor, with the associated relative joint position of J with respect to the center of Q in the depth map from which Q was taken, calculate the weighting terms based on the following information sources:

1. $L_2$ distance between the query and retrieved descriptors: Let $$[x]^+ = \begin{cases} x & \text{if } x \geq 0 \\ 0 & \text{otherwise} \end{cases}$$

be a threshold function. This computation gives the similarity term $T_1 = [1 - D_1/P_1]^+ \cdot W_1$ wherein $P_1$ and $W_1$ are adjustable parameters.

2. Real world, Euclidian distance $D_2$ between the patch center and the joint location in the query result, giving the patch distance term $T_2 = [1 - D_2/P_2]^+ \cdot W_2$.

3. Distance $D_3$, in pixels, in the input depth map, between the (already estimated) location of a "parent" joint (in the hierarchical body model) and the center of the query patch:

Let $$\text{Cut}(x, th) = \begin{cases} x & \text{if } x \geq th \\ th & \text{otherwise} \end{cases}$$

This computation gives the joint distance term $T_3 = \text{Cut}(1-D_3/P_3, \epsilon_3) \cdot W_3$, wherein $\epsilon_3$, $P_3$ and $W_3$ are adjustable parameters. As noted earlier, the body model is based on parent→child relations and describes connected joints, from the center of the body towards the limbs, that is: shoulder→elbow→hand; hip→knee→foot.

4. Euclidian distance $D_4$ between the estimated location of J based on the current query result and the expected location of J based on its location and velocity estimated from previous frames, giving the predictive term $T_4 = [1-D_4/P_4]^+ \cdot W_4$.

5. The variance $V_{P;J}$ measured during the learning phase for the locations of the same joint, in many learned examples, whose depth-visibility is similar to the visibility of the current depth-patch, giving the variance term:

$$T_5 = [1-\log(V_{Q;J} P_5)]^+ \cdot W_5.$$

6. The distance between the current estimated bone length and the expected bone length, giving a term $T_6$ that is inversely proportional to this distance.

The overall weight of the estimated location of J based on the retrieved patch Q is a product of the terms:

$$W_{P;Q;J} = T_1 \cdot T_2 \cdot T_3 \cdot T_4 \cdot T_5 \cdot T_6$$

If $W_{P;Q;J}$ is below a parameter $W_{min}$, then the estimated location of J based on Q is not used in finding the joint location in step 128.

Additionally or alternatively, as noted earlier, the above weight calculation may be modified to include terms corresponding to factors such as "no depth" areas, hidden joints, and "jumping" joints.

The invention claimed is:

1. A method for processing data, comprising:
receiving a depth map of a scene containing a humanoid form, the depth map comprising a matrix of pixels having respective pixel depth values;
extracting from the depth map respective descriptors based on the depth values in a plurality of overlapping patches distributed in respective positions over the humanoid form, by dividing each patch into an array of spatial bins, and computing a vector of descriptor values corresponding to the pixel depth values in each of the spatial bins;
matching the extracted descriptors to previously-stored descriptors in a database; and
estimating a pose of the humanoid form based on stored information associated with the matched descriptors.

2. The method according to claim 1, wherein each patch has a center point, and wherein the spatial bins that are adjacent to the center point have smaller respective areas than the spatial bins at a periphery of the patch.

3. The method according to claim 1, wherein each patch has a center point, and wherein the spatial bins are arranged radially around the center point.

4. The method according to claim 1, wherein the descriptor values are indicative of a distribution of at least one type of depth feature in each bin, selected from the group of depth features consisting of depth edges and depth ridges.

5. The method according to claim 1, wherein matching the extracted descriptors comprises finding a respective approximate nearest neighbor of each of the matched extracted descriptors among the stored descriptors in the database.

6. The method according to claim 1, wherein the descriptors in the database are associated with corresponding pointers to respective locations of body joints, and
wherein estimating the pose comprises applying the pointers to the respective positions of the patches from which the matching descriptors were extracted in order to estimate the locations of the joints of the humanoid form.

7. The method according to claim 1, and comprising creating the database by processing a set of training maps in which ground-truth locations of the body joints are indicated in order to find the corresponding pointers.

8. The method according to claim 1, wherein receiving the depth map comprises receiving a sequence of depth maps, and wherein estimating the pose comprises tracking movement of the humanoid form over multiple frames in the sequence.

9. The method according to claim 8, and comprising controlling a computer application responsively to the tracked movement.

10. Mapping apparatus, comprising:
an imaging assembly, which is configured to provide a depth map of a scene containing a humanoid form, the depth map comprising a matrix of pixels having respective pixel depth values; and
a processor, which is configured to extract from the depth map respective descriptors based on the depth values in a plurality of overlapping patches distributed in respective positions over the humanoid form, by dividing each patch into an array of spatial bins, and computing a vector of descriptor values corresponding to the pixel depth values in each of the spatial bins, to match the extracted descriptors to previously-stored descriptors in a database, and to estimate a pose of the humanoid form based on stored information associated with the matched descriptors.

11. The apparatus according to claim 10, wherein each patch has a center point, and wherein the spatial bins that are adjacent to the center point have smaller respective areas than the spatial bins at a periphery of the patch.

12. The apparatus according to claim 10, wherein each patch has a center point, and wherein the spatial bins are arranged radially around the center point.

13. The apparatus according to claim 10, wherein the descriptor values are indicative of a distribution of at least one type of depth feature in each bin, selected from the group of depth features consisting of depth edges and depth ridges.

14. The apparatus according to claim 13, wherein the distribution is indicative of at least one characteristic of the depth features, selected from the group of characteristics consisting of a spatial distribution of the depth features and a directional distribution of the depth features.

15. The apparatus according to claim 10, wherein the processor is configured to match the extracted descriptors by finding a respective approximate nearest neighbor of each of the matched extracted descriptors among the stored descriptors in the database.

16. The apparatus according to claim 10, wherein the descriptors in the database are associated with corresponding pointers to respective locations of body joints, and
wherein the processor is configured to estimate the pose by applying the pointers to the respective positions of the patches from which the matching descriptors were extracted in order to estimate the locations of the joints of the humanoid form.

17. The apparatus according to claim 16, wherein the database is created by processing a set of training maps in which ground-truth locations of the body joints are indicated in order to find the corresponding pointers.

18. The apparatus according to claim 16, wherein the processor is configured to associate respective weights with the estimated locations of the joints provided by the extracted descriptors, and to apply a weighted voting process using the weights to find the locations of the joints.

19. The apparatus according to claim 18, wherein the weights comprise at least one weighting term that is selected from a group of weighting terms consisting of:
- a similarity term, based on a descriptor distance between the matched descriptors;
- a patch distance term, based on a Euclidean distance between a patch position and a joint location;
- a joint distance term, based on a joint distance between a given joint location and a parent joint location that has already been estimated;
- a predictive term, based on a previous joint location derived from a preceding depth map;
- a variance term, based on a variance of the joint location determined in creating the database; and
- a bone length term, based on distance between a current estimated bone length and an expected bone length derived from the locations of the joints.

20. The apparatus according to claim 18, wherein the processor is configured to assess a reliability of the patches providing the estimated locations, and to assign reliability values to the estimated locations based on the assessed reliability.

21. The apparatus according to claim 10, wherein the processor is configured to normalize a depth of the depth map by finding a representative depth coordinate of the humanoid form in the depth map and projecting a point cloud derived from the depth map responsively to the representative depth coordinate, and to apply the normalized depth in matching the descriptors and estimating the pose.

22. The apparatus according to claim 10, wherein the processor is configured to find respective locations of joints of the humanoid form, and to calibrate a scale of the humanoid form by finding a distance between the locations of the joints and scaling the depth map responsively to the distance, and to apply the calibrated scale in matching the descriptors and estimating the pose.

23. The apparatus according to claim 10, wherein the imaging assembly is configured to provide a sequence of depth maps, and wherein the processor is configured to track movement of the humanoid form over multiple frames in the sequence.

24. The apparatus according to claim 23, wherein the processor is configured to control a computer application responsively to the tracked movement.

25. A computer software product embodied in a non-transitory computer-readable medium in which program instructions are stored, which instructions, when read by a computer, cause the computer to receive a depth map of a scene containing a humanoid form, the depth map comprising a matrix of pixels having respective pixel depth values, to extract from the depth map respective descriptors based on the depth values in a plurality of overlapping patches distributed in respective positions over the humanoid form, by dividing each patch into an array of spatial bins, and computing a vector of descriptor values corresponding to the pixel depth values in each of the spatial bins, to match the extracted descriptors to previously-stored descriptors in a database, and to estimate a pose of the humanoid form based on stored information associated with the matched descriptors.

* * * * *